May 26, 1942.  H. Z. MARTIN  2,284,584
REGENERATION OF CONTACT MASSES
Filed Sept. 14, 1940
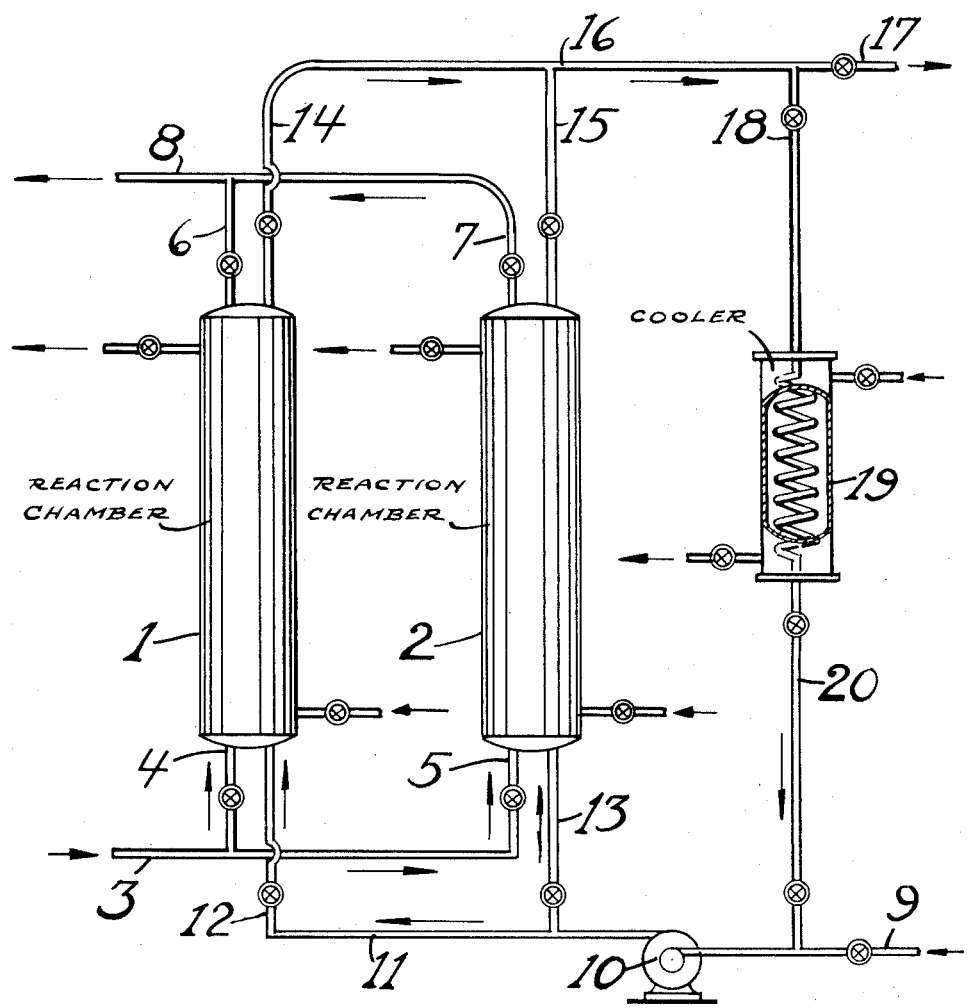
Homer Z. Martin Inventor
By P. L. Young Attorney Patented May 26, 1942

2,284,584

UNITED STATES PATENT OFFICE 2,284,584

REGENERATION OF CONTACT MASSES

Homer Z. Martin, Elizabeth, N. J., assignor to Standard Oil Development Company, a corporation of Delaware Application September 14, 1940, Serial No. 356,812

1 Claim. (Cl. 252—242)

This invention relates to the regeneration of contact masses containing combustible deposits, and pertains more particularly to a method of regenerating fixed beds or masses of contact materials contained within a bank of reaction or treating chambers.

While the invention in its broader phases has a more general application, as will appear hereinafter, it pertains more particularly to the regeneration of solid contact masses employed in the treatment of hydrocarbon oils such as in the conversion, purification and refining of such oils. The conversion of hydrocarbon oils may involve, for example, catalytic cracking, polymerization, alkylation, isomerization, hydrogenation, dehydrogenation, or the like, whereas the purification and refining of such oils may involve reforming, desulfurization, stabilization, decolorization, or the like. The invention in its narrower phases has specific application to the catalytic cracking of such oils to form motor fuels, and for illustrative purposes the invention will be described with particular reference thereto.

In the catalytic cracking of hydrocarbon oils and in other types of reactions before mentioned, the contact mass rapidly becomes fouled with carbonaceous deposits which reduce the efficiency of such materials for bringing about the desired treatment. In view of this, it is necessary to frequently regenerate such masses. According to one mode of operation heretofore used, the treatment in the individual treating chambers is interrupted to effect the regeneration of the contact mass. This regeneration is normally accomplished by passing an oxidizing gas through the contact mass at a temperature sufficient to burn the carbonaceous deposits but below that which would impair the activity of the catalyst for bringing about the desired treatment. The temperature of regeneration may be controlled, for example, by recycling part of the spent regeneration gas after cooling the latter in any desired manner. Such a mode of operation involves alternate periods or cycles of treatment and regeneration of the contact mass in the individual chambers.

Furthermore, in many cases it is desirable to condition the contact mass between the treating and regenerating cycles and vice versa. This conditioning may involve the purging of the contact mass of reaction vapors following the treating period to remove reaction products and the purging of the contact mass of oxygen containing gas following the regeneration periods. Both purging steps are primarily to prevent intermingling of oxygen containing gas employed during regeneration with oil vapors trapped in the contact mass after the treating periods.

The principal object of the present invention is to provide an improved method of purging and regenerating contact masses in which the regeneration and purging can be accomplished more rapidly and thus reduce the length of time the reaction chamber is out of productive operation.

More specific objects and advantages of the invention will be apparent from the detailed description hereinafter in which reference will be made to the accompanying drawing which is a diagrammatic illustration of an apparatus suitable for carrying the invention into effect.

Referring to the drawing, reference characters 1 and 2 designate two reaction chambers, each of which is adapted to contain contact masses to be regenerated. The particular construction of such chambers forms no part of the present invention. In order to circulate the regenerating gas at a high velocity with minimum resistance to flow, it is usually desirable to provide a relatively short path for the regenerating gases passing through the contact mass within the reaction chambers. This can be accomplished, for example, by providing a plurality of spaced shallow beds of contact mass within each reaction chamber and by providing suitable distributing pipes to permit the regenerating gas to pass in parallel through the individual beds. Another method of accomplishing this is to place the plurality of perforated tubes within the contact mass for the introduction and removal of regenerating gas.

The reaction chambers 1 and 2 are intended to operate under a different phase of the complete cycle. For example, during certain periods of operation one reaction chamber may be undergoing the regenerating while the other is undergoing the reacting portion of the cycle.

The number of reaction chambers employed is not limited to two as shown in the drawing, but any desired number may be provided.

In accordance with the present invention, during certain periods of operation regenerating gas removed from a reaction chamber which is undergoing initial stages of regeneration is divided, a part being recycled to the same reaction chamber while another part is passed to another reaction chamber which is just completing the regeneration. During the same period regenerating gas withdrawn from a reaction chamber undergoing final stages of regeneration is divided, a part being recycled to the same chamber and a part being passed to a reaction chamber undergoing initial stages of regeneration. Expressed in another way, reaction chambers undergoing initial and final stages of regeneration are operated in parallel. During this period the oxygen supply is discontinued. As a result the carbonaceous deposits on the catalyst undergoing initial stages of regeneration are utilized to burn the excess oxygen in the gases passing through the reaction chamber undergoing the final stages of regeneration.

Referring again to the drawing, products to be reacted are passed to reaction chambers 1 and 2 through line 3 having valved branch lines 4 and 5 leading to reaction chambers 1 and 2. These products may, for example, be oil vapors which are to be cracked to form lower boiling hydrocarbons suitable for motor fuel, or they may be motor fuel constituents which are to be reformed to improve the anti-knock characteristics thereof.

The reaction products are removed from the reaction chambers 1 and 2 through outlets 6 and 7, respectively, leading to a common manifold 8 from which they are passed to suitable purification and fractionating equipment (not shown) for the purification and segregation of the desired products from the total reaction products.

Regeneration of the contact material within the reaction chambers 1 and 2 is accomplished by means of an oxidizing gas such as air or other oxygen containing gas introduced into the system through line 9 which leads to the suction side of a blower 10. The regenerating gas is forced by the blower 10 through line 11 and valved branch lines 12 and 13 to reaction chambers 1 and 2, respectively. Spent regenerating gas is withdrawn from reaction chambers 1 and 2 through valved lines 14 and 15, respectively, leading to a common manifold 16. These products may be rejected from the system through line 17. However, in order to control the temperature during regeneration, it is usually desirable to recirculate a portion of the spent regenerating gas back to the reaction chamber. This is accomplished, according to the drawing, by passing a portion of the spent regenerating gas through line 18, cooler 19, and line 20 to the inlet side of the blower 10. The amount of cooled regenerating gas recirculated as compared with the amount of air introduced through line 9 is regulated to prevent excessive temperatures in the reaction chambers 1 or 2, as the case may be, during the regenerating period.

As previously mentioned, the complete operating cycle involves (1) the treating or reacting period, (2) the conditioning period following the reacting period in which the reaction chamber is purged of reaction products and if necessary brought to the required pressure for accomplishing the regeneration, (3) the regenerating period in which carbonaceous deposits are removed from the contact mass within the individual reaction chambers, and (4) further conditioning of the contact mass following the regenerating period to remove regenerating gases from the chambers and to adjust the pressure in case a differential pressure is maintained during the treating and regenerating periods.

In accordance with prior practices, in order to accomplish the purging or conditioning treatment following regeneration the oxygen supply to the reaction chamber which is undergoing regeneration is first cut off and an inert stripping gas is then introduced into the reaction chamber. The purpose of this is to remove the oxygen from the reaction chamber and to prevent it from commingling with the products undergoing reaction at the start of the reacting period.

In accordance with the present invention, the atmosphere within the reaction chambers 1 and 2 is purged of oxygen by operating the reaction chamber undergoing initial stages of regeneration in parallel with the reaction chamber undergoing final stages of regeneration so that the carbon contained in the contact mass in the chamber undergoing initial stages of regeneration is used to exhaust the oxygen from the circulating stream.

For example, assume that reaction chamber 2 is undergoing the final stages of regeneration whereas reaction chamber 1 has been purged of reaction products and is about to begin regeneration. The valves in lines 12 and 13 and 14 and 15 are opened so that regenerating gas circulates through both reaction chambers 1 and 2. The valve in the inlet line 9 for introducing the oxygen containing gas is closed during this period. In this way excess oxygen in the circulating system is exhausted by burning carbonaceous deposits in reaction chamber 1 so that reaction chamber 2 is freed of oxidizing gas. When the oxygen present in the circulating system has been removed, the valve in lines 13 and 15 may be closed and the regeneration continued in reaction chamber 1 while the reaction products may be introduced immediately into reaction chamber 2 without an intermediate purging treatment.

Having described the preferred embodiment of the invention, it will be understood that it embraces such other variations and modifications as come within the spirit and scope thereof.

I claim:

In contact processes employing fixed beds of solid contact material positioned in a bank of reaction chambers which are subjected to alternate periods of treating and oxidative regeneration wherein spent regenerating gas removed from the chambers during the final stages of regeneration contains an excess of free oxygen which is purged from the reaction chamber before starting the next treating period and wherein the reaction and regenerating periods for the separate reaction chambers are arranged in staggered relation so that one reaction chamber is starting regeneration while another is undergoing purging treatment following the regenerating period; the method of purging the reaction chamber following the regenerating period which comprises discontinuing the oxygen supply to the reaction chambers to be purged upon completion of the regeneration period, thereafter circulating spent regenerating gas containing unconsumed oxygen removed from said last-named chamber in parallel through a reaction chamber undergoing initial stages of regeneration and the reaction chamber to be purged whereby excess oxygen present in said spent regenerating gas is consumed by regenerating contact material into said chamber undergoing initial stages of regeneration, continuing the recirculation of said spent regenerating gas in parallel through said chambers until the excess oxygen present in said gas is substantially exhausted, thereafter discontinuing the circulation of spent regenerating gas through said chamber undergoing purging treatment and thereafter passing gases to be treated therethrough.

HOMER Z. MARTIN.